May 17, 1938.  K. C. D. HICKMAN  2,117,803
VACUUM DISTILLATION PROCESS
Filed Dec. 4, 1936
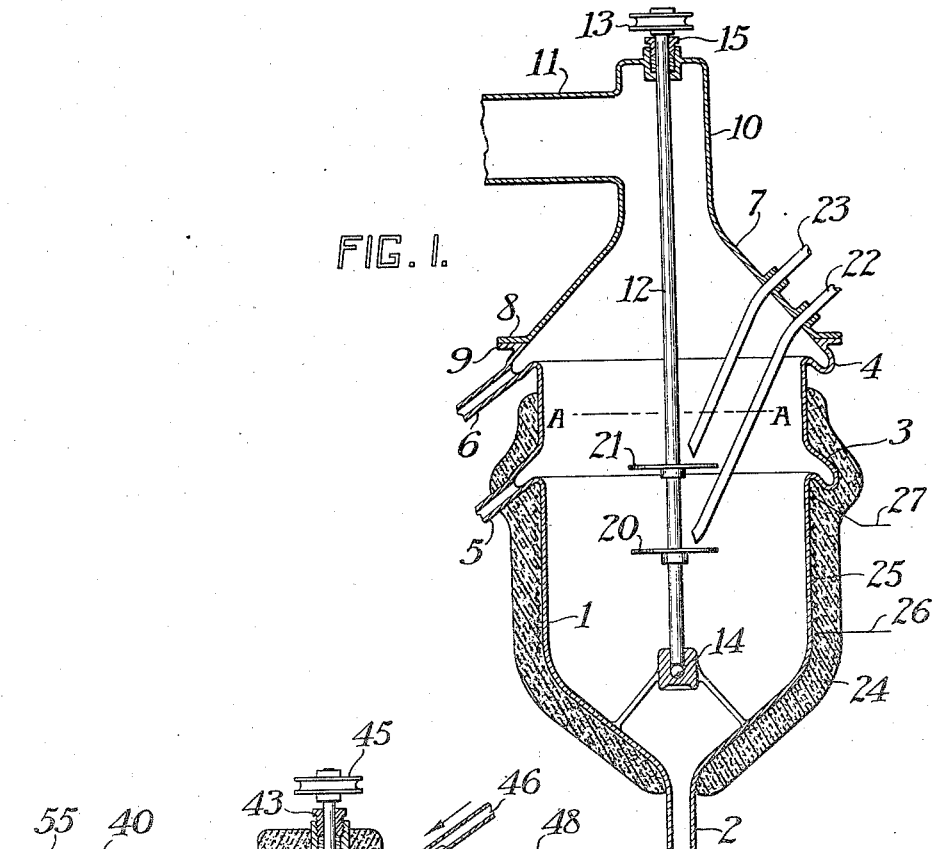
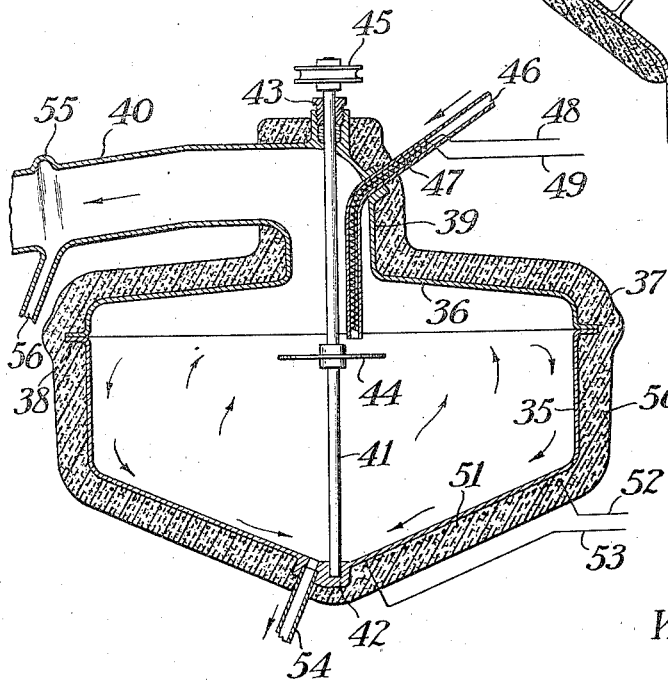
Kenneth C. D. Hickman
INVENTOR.
BY
ATTORNEYS Patented May 17, 1938

2,117,803

UNITED STATES PATENT OFFICE 2,117,803

VACUUM DISTILLATION PROCESS

Kenneth C. D. Hickman, Rochester, N. Y., assignor to Eastman Kodak Company, Rochester, N. Y., a corporation of New Jersey Application December 4, 1936, Serial No. 114,226
In Great Britain July 6, 1936

7 Claims. (Cl. 202—64)

This invention relates to improvements in vacuum distillation and particularly in the vacuum distillation of thermally labile materials such as vitamins.

In carrying out the high vacuum distillation of marine animal oils to separate vitamin containing distillates it has been found that losses due to thermal decomposition and/or oxidation were substantial and increased greatly with elevation of temperature. This action was found to be especially troublesome when recovering the high boiling forms of vitamins A and D which distill over a temperature range of about 180°–260° C. At these temperatures the vitamins can be heated for only a short period of time, vitamin D being especially heat labile and should not usually be heated for a period greatly exceeding a few seconds if substantial decomposition is to be avoided. The distillation procedure heretofore employed, namely flowing the oil by gravity over a heated surface in a thin film, necessitated such prolonged heating that decomposition could not be avoided. While decomposition of the lower boiling forms of vitamins A and D, which distill at about 118° and 144° C. respectively, is not as great, it is sufficient to reduce the economy of the process.

This invention has for its object to overcome the deficiencies of the above described processes. Another object is to provide a process whereby thermally unstable materials can be vacuum distilled without substantial loss due to thermal destruction. A further object is to provide a high vacuum distillation process whereby fat soluble vitamins can be distilled without material loss due to thermal decomposition or oxidation. A still further object is to provide a process of short path vacuum distillation whereby rapid vaporization takes place and only a short heating period is necessary. Other objects will appear hereinafter.

These objects are accomplished by subjecting the material containing the heat labile compound to be distilled, such as a vitamin containing oil to the direct heating action of the vapors of a compound having a lower vapor pressure than the substance to be recovered as distillate. In its preferred form the invention involves disposing the material to be distilled, in a finely divided or attenuated state, in the heating vapors.

In the following examples and description I have set forth many examples of the method of carrying out my invention, but it is to be understood that they are given for the purposes of illustration and not as limitations thereof.

In carrying out my invention a body of the heating vapor is produced in and maintained under a vacuum. This can be conveniently done by passing the liquid to be vaporized over a heated surface inside the evacuated chamber. The material to be distilled is then directly contacted with these vapors preferably while it is in a form such that its surface area is greatly increased. This condition can be obtained by spraying it into the heated vapors to form minute droplets which are immediately heated by the vapors, or the material can be thrown into the vapors in the form of a continuous or broken sheet of extreme thinness. Other means of obtaining fine subdivision can be used such as converting the material into a fog or mist in which the particles are of such small dimensions that they are hardly affected by gravitational force.

When the material to be distilled is introduced into the vapors in this divided state it is apparent that each small particle or droplet will almost immediately be heated to the temperature of the heating vapors. For this reason vaporization takes place instantaneously and as quick condensation follows, the heating period required for the distillation is enormously reduced as compared to prior known processes.

In the accompanying drawing I have illustrated sectional elevations of two forms of apparatus in which my invention can be conveniently carried out.

Referring to Fig. 1 reference numeral 1 designates a cylindrical distillation chamber provided with a conduit 2 in the base thereof and the walls of which are provided with annular gutters 3 and 4 which are provided with withdrawal conduits 5 and 6. The top 7 is fixed to the still chamber in gas tight manner by flanges 8 and 9 as shown. Part 7 slopes inwardly to form a dome which terminates in a cylindrical portion 10. Conduit 11 communicates with cylindrical portion 10 and connects to vacuum pumps (not shown) which serve to evacuate the still chamber. A shaft 12 provided with a driving pulley 13 extends into the still as illustrated and is housed in bearing 14 and gas tight bearing 15. Disc shaped plates 20 and 21 are mounted upon shaft 12, disc 21 being so located that it is on the same horizontal plane as the center of gutter 3. Conduits 22 and 23 terminate just above the central surfaces of discs 20 and 21 respectively and serve to convey liquids onto the upper surfaces thereof. The lower portion of chamber 1 is provided with a layer of insulating material 24 in which is disposed an electrical heating unit 25 terminating in leads 26 and 27 through which the heating current is circulated.

Referring to Fig. 2, numeral 35 designates a cylindrical lower section and 36 the upper portion of a still chamber, the two sections being secured together to form a gas tight seal by flanges 37 and 38. A right angle conduit 39 is fixed at one end to the central portion of top 36 and at the other end to conduit 40 which connects with high vacuum pumps (not shown). A shaft 41 extends the length of the still chamber and is housed at the lower end in bearing 42 and at the upper end in gas tight bearing 43. The shaft is provided with a disc 44 and a driving pulley 45. A conduit 46 terminates near the upper surface of disc 44 and is provided with an internal heating coil 47 which is heated by electrical current circulated through leads 48 and 49. The entire still chamber is covered with a heat insulating jacket 50 in which is disposed an electrical heating unit 51 which terminates in leads 52 and 53. A conduit 54 communicates with the lowest portion of the base of section 35. Conduit 40 is flared outwardly to form an annular channel 55, the lower portion of which communicates with conduit 56.

In operating the apparatus of Fig. 1 the system is evacuated through conduit 11, the walls of 1 are heated by unit 25 and the heating fluid to be vaporized and which may be preheated is introduced through conduit 22. Shaft 12 is caused to rotate at a high speed and fluid dropping on disc 20 is thrown off as a sheet or spray by centrifugal force and is heated by contact with the heated walls. When the temperature is properly regulated for the particular heating substance and vacuum used, vaporization of the heating substance takes place and the vapors will substantially remain in the lower portion of the chamber forming a vapor line or point of condensation at a substantially horizontal line A—A. Due to re-evaporation on the walls and in the base, the introduction of fluid through a conduit 22 may be intermittent or relatively slow. When the body of heating vapors is thus established, material to be distilled which is preferably degassed and preheated is introduced through conduit 23 at a regulated rate. The liquid falling on plate 21 is thrown off as a very thin film, spray or fog, depending on the speed of rotation, and the material is thus brought into intimate contact with the heating vapors. Volatile constituents are vaporized and nonvolatile constituents with condensed heating fluid fall or flow to the base. The vapors thus generated travel up into contact with the cool walls of 7 where they are condensed and flow down into gutter 4 and may be withdrawn through conduit 6. Accumulated undistilled residue is withdrawn continuously or intermittently through conduit 2.

When shaft 12 is rotated at slower speeds a thin sheet or droplets having a horizontal direction of travel are thrown into gutter 3 and may be withdrawn through conduit 5. Since the material thus collected has travelled through the hot vapors for an appreciable distance they will have lost all of the desired volatiles or only part thereof depending on the distance, temperature, material distilled, speed of rotation, etc. These can be varied to give complete or partial distillation. In case the latter is desired, complete recovery can be effected either by a second or plurality of passages through the same still or through a number of stills in series.

In operation, employing the apparatus of Fig. 2, the still is evacuated through conduit 40 and the heating liquid is introduced either through conduit 46 or 54. Unit 51 is heated to the appropriate temperature and a body of heating vapors thus established in the still. Heating unit 47 is then put in operation and the mixture to be distilled is introduced through conduit 46. The preheated mixture falls onto rotating disc 44 and is dispersed in the heating vapors in the same manner as described in connection with Fig. 1. Vaporized molecules travel through conduit 39 and are condensed in conduit 40. The condensate flows into channel 55 and is withdrawn through conduit 56. Undistilled material and condensed heating vapor flows down the heated walls of 35 and at least part is re-evaporated. Excess is withdrawn through conduit 54. This apparatus is especially suited for use in a process in which the oil distilled is made to furnish its own heating vapor. Since organic materials such as glycerides have a low latent heat of vaporization, a large volume of heating vapors would be required to heat a small volume of distilland from room to distilling temperature. For this reason it is desirable to preheat the distilland before it is sprayed into the vapors. It is best to preheat to as high a temperature as possible without initiating thermal decomposition and then quickly spray the heated distilland into the heating vapors where the distillation at destructive temperatures is completed in a very short period of time. The preheater illustrated in Fig. 2 could be used with advantage in the apparatus of Fig. 1. Obviously other widely different forms of preheaters could be employed. It is possible that slight decomposition will take place during the preheating step and it is therefore desirable to preheat as rapidly as possible.

For optimum results the rate of admission of distilland and the temperature of the heating vapors are so regulated that the heating vapors condense on the spray flung from the disc. The vapors of heating fluid are then replaced by vapors of distillate which pass upwards into the condenser.

Many changes and modifications can be made in the above described apparatus without departing from the spirit or scope of my invention. The centrifugal disc for instance can be of any desired size and can be of any suitable shape such as conical. The spray can also be produced by other means than centrifugal force, for instance, the liquids to be sprayed can be forced through spray nozzles, or be atomized by other suitable means. When employing centrifugal force, speeds of rotation of between about 500 to 6000 R. P. M. are usually most satisfactory, but higher speeds up to about 25,000 R. P. M. give finer subdivision and are therefore desirable in certain cases. Also the heating vapors can be generated outside of the still and introduced into the distilling chamber in any desired manner.

As pointed out above, the heating fluid should have a lower vapor pressure than the substance to be recovered as distillate. If the vapor pressure approaches that of the distillate the vapor line will be close to the condenser and contamination of the condensate by the heating fluid will result. This is not objectionable in many cases and such procedure may be advantageous to follow in distilling many materials. Where no contamination is desired, or only slight contamination can be tolerated it is best to employ a heating liquid which has a substantially lower vapor pressure than that of the desired distillate.

The heating fluid employed may be any organic compound which has the requisite vapor pressure and which can be vaporized without substantial decomposition under the conditions of temperature and pressure employed. It should not be a compound which will react with the distillate unless such reaction is desired. Materials such as hydrocarbons, especially of high boiling point, alcohols, esters such as glycerides for instance natural animal and vegetable oils, trimyristin, tripalmitin, tri-pelargonin, trilaurin, triolein, diglycerol tetra propionate, etc. are satisfactory, especially when vitamin containing oils are distilled. It is entirely feasible to use the glyceride content of the vitamin containing oil as the heating medium. When using this expedient a body of the oil vapors is established and the vitamin oil sprayed into it. The vitamins are vaporized and the glycerides condense and may be continuously re-vaporized and used again as the heating vapors, excess accumulated glycerides being continuously removed. By operating in this way the material distilled is made to furnish its own vapor of heating fluid.

The conditions of temperature and pressure employed in the process of my invention will obviously vary with the particular material being distilled. Temperatures between 100° and 350° C. are most generally used, and those between about 100° and 300° C. and especially 100°–250° C. when vitamins are recovered from natural oils. Since the heating period is very brief, temperatures considerably in excess of normal decomposition points can be used. Pressures of less than 20 mm. are desirable and when recovering vitamins it is desirable to operate at below 1 mm. and preferably below .1 mm. such as for instance at between about .01 and .0001 mm.

The process of my invention is applicable to the distillation of widely different types and classes of material and while I have found it convenient to describe the process by reference to particular materials it is applicable generally to the recovery of heat labile compounds especially of low vapor pressure. Vitamins can be recovered from animal and vegetable oils and concentrates thereof such as cod-liver, halibut, tuna, salmon, sardine, menhaden, dog-fish, herring etc., body and liver oils. Sterols, hormones, sterol glucosides of the digitalis type, unsaturated glycerides etc. are examples of other materials which can be distilled with ease by proceeding in accordance with my invention.

It is preferred to employ distillation apparatus in which the evaporating zone and condensing surfaces are separated by free unrestricted space. The distance between the two can vary greatly, but it is desirable to have them separated by a distance such that contamination of the condensing surface by heating vapors is slight. Since very rapid vaporization takes place pressures higher than those used in molecular distillation can be used. Distances of separation may be molecular i. e. at less than the mean free path, but it is preferable to use greater distances in order to decrease contamination. Distillate can be withdrawn through large admittance side tubes and condensed at a distance as illustrated in Fig. 2. This construction is useful when it is desired to decrease heat losses due to radiation.

When distilling oxidizable material or when using low pressures such as below .1 mm., it is best to degas the distilland before it is introduced into the still. This can be accomplished by subjecting the mixture to high vacuum while warming slightly if desired. A preferred method of this general nature is disclosed in my co-pending application #48,691 filed November 6, 1935.

What I claim is:

1. The process of distilling an organic mixture which is fluid at the temperature of distillation, which comprises spraying the mixture in a finely subdivided state into a localized body of hot vapors maintained under a pressure of below about .1 mm. and condensing molecules which are vaporized by contact with the hot vapors upon a condensing surface which is not in contact with the localized body of hot vapors, the body of hot vapors being derived from a substance which has a substantially lower vapor pressure than the distillate at the operating conditions.

2. The process of distilling an organic mixture which is liquid at the temperature of distillation which comprises spraying the mixture in a finely subdivided state into a localized body of hot vapors which is maintained under a high vacuum and condensing molecules which are vaporized by contact with the hot vapors upon a condensing surface which is not in contact with the localized body of hot vapors, the body of hot vapors being derived from a substance which has a lower vapor pressure than the condensate at the operating conditions.

3. The process of distilling an organic mixture which is fluid at the temperature of distillation which comprises spraying the mixture in a finely subdivided state into a localized body of hot vapors which is maintained under a high vacuum and condensing molecules which are vaporized by contact with the hot vapors upon a condensing surface which is not in contact with the localized body of hot vapors, the body of hot vapors being derived from a glyceride which has a substantially lower vapor pressure than the distillate at the operating conditions.

4. The process of distilling an organic mixture which is fluid at the temperature of distillation and which contains a thermally unstable constituent to be removed as a distillate which comprises spraying the mixture in a finely subdivided state into a localized body of hot vapors which is maintained under a pressure of below about .1 mm. and condensing molecules which are vaporized by contact with the hot vapors upon a condensing surface which is not in contact with the localized body of hot vapors, the body of hot vapors being derived from a substance which has a lower vapor pressure than the distillate at the operating conditions.

5. The process of distilling an oil containing a vitamin which comprises spraying the oil in a finely subdivided state into a localized body of hot vapors maintained under a pressure of below about .1 mm. and condensing vitamin molecules which are vaporized by contact with the hot vapors upon a condensing surface which is not in contact with the localized body of hot vapors, the body of hot vapors being derived from a substance which has a lower vapor pressure than the vitamin distillate at the operating conditions.

6. The process of distilling a fish oil containing a vitamin which comprises spraying the oil in a finely subdivided state into a localized body of hot vapors maintained under a pressure of below about .1 mm. and condensing vitamin molecules which are vaporized by contact with the hot vapors upon a condensing surface which is not in contact with the localized body of hot vapors, the body of hot vapors being derived from a substance which has a lower vapor pressure than the vitamin distillate at the operating conditions.

7. The process of distilling a fish oil containing a vitamin which comprises spraying the oil in a finely subdivided state into a localized body of vapor maintained at a temperature of about 100° to 300° C. and under a pressure of below about .1 mm., and condensing vitamin molecules which are vaporized by contact with the hot vapors upon a condensing surface which is not in contact with the localized body of hot vapors, the body of hot vapors being derived from a substance which has a lower vapor pressure than the vitamin distillate at the operating conditions.

KENNETH C. D. HICKMAN.